United States Patent [19]

Noble et al.

[11] 4,390,816
[45] Jun. 28, 1983

[54] SCAN CORRECTED VIDICON CAMERA APPARATUS

[75] Inventors: Milton L. Noble, Liverpool; William G. Hoefer, Syracuse, both of N.Y.

[73] Assignee: The United States of America as represented by the Secretary of the Air Force, Washington, D.C.

[21] Appl. No.: 200,226

[22] Filed: Oct. 23, 1980

[51] Int. Cl.³ .............................................. H01J 29/56
[52] U.S. Cl. ................................................. 315/370
[58] Field of Search ................. 315/10, 364, 370, 371; 358/51, 41, 42

[56] References Cited

U.S. PATENT DOCUMENTS 3,728,576  4/1973  Vogenthaler et al. ............... 315/10
3,894,259  7/1975  Webb .................................... 315/10

Primary Examiner—Theodore M. Blum
Attorney, Agent, or Firm—Donald J. Singer; William Stepanishen

[57] ABSTRACT

A scan corrected vidicon camera apparatus utilizing a spatial reference filter with an array of slits that is fitted directly on the faceplate of a vidicon tube. The spatial reference filter is used in conjunction with perturbations that are injected into the vertical and horizontal sweeps. The resultant video waveform is correlated in a microprocessor unit to linearize the respective sweeps.

9 Claims, 6 Drawing Figures

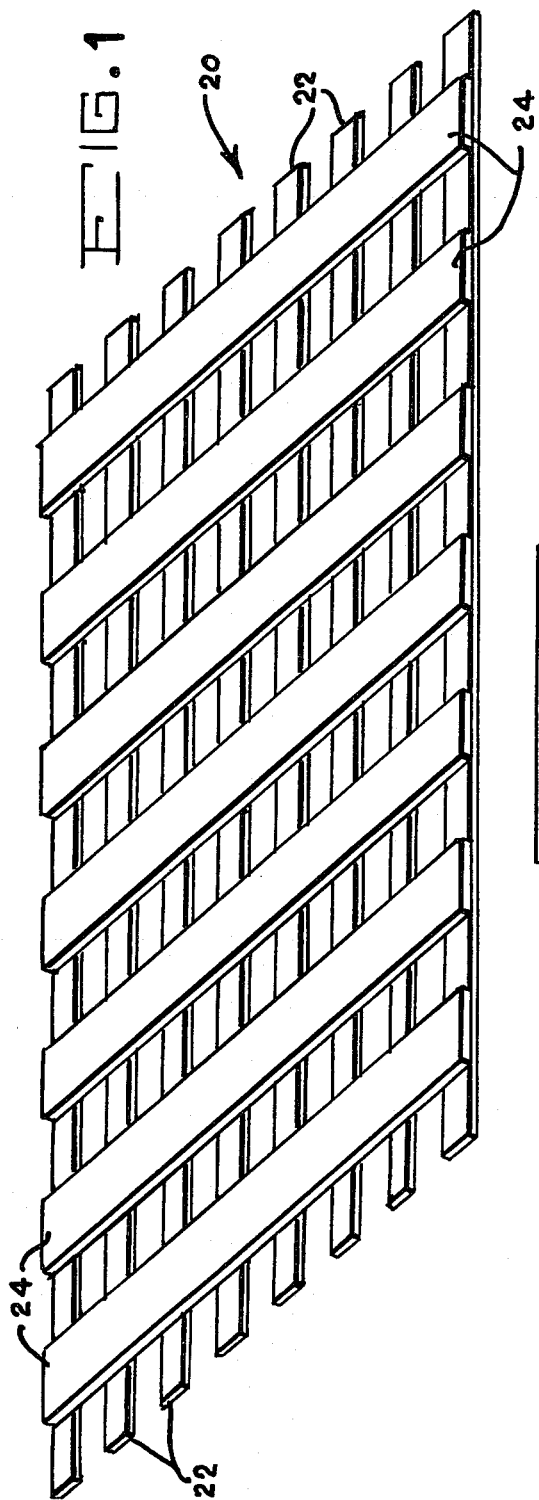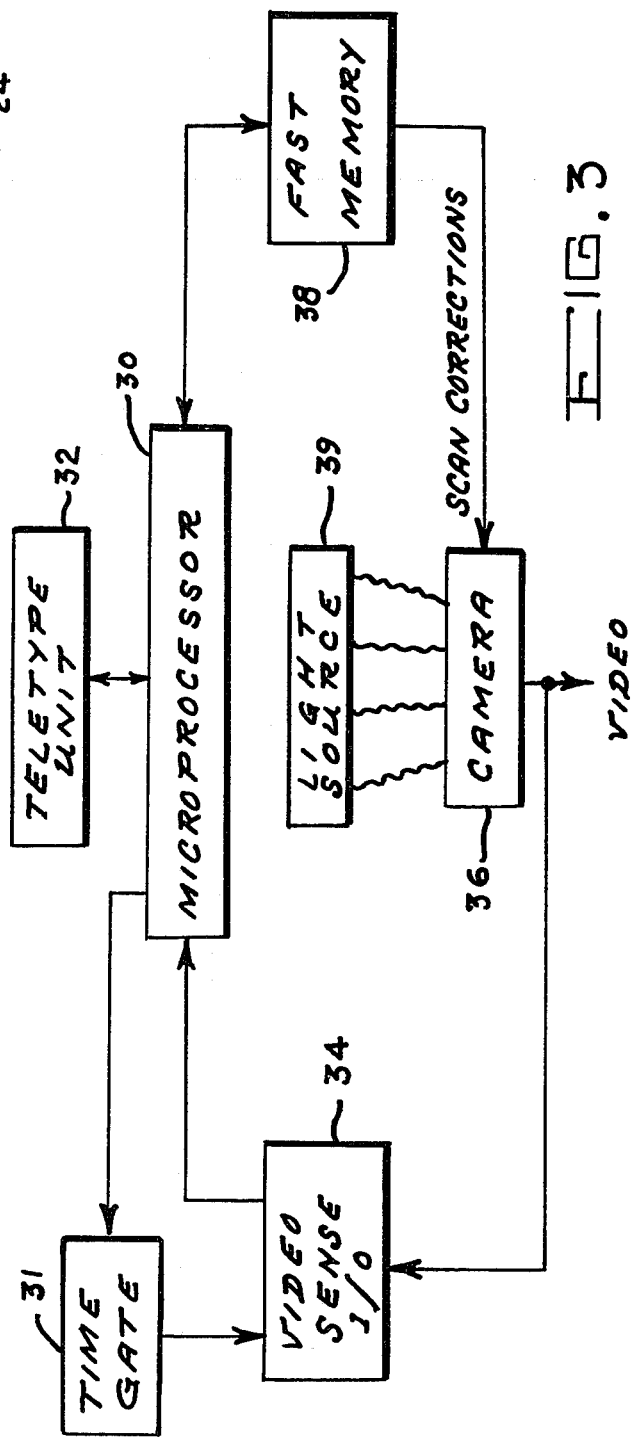

SCAN CORRECTED VIDICON CAMERA APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to camera systems, and in particular to a scan corrected vidicon camera.

In the present art, a major limitation in the use of vidicon cameras is the problem of image distortion. Techniques have been advanced to correct the errors in the vertical scan, however, these techniques require the use of a minicomputer which greatly increases the cost of such systems.

In general, such systems operate to automatically generate a digital correction over a 32×32 correction array and only the vertical scan errors were corrected. There were no provisions to provide corrections for the horizontal scan. The scan correction is achieved by illuminating the target with an array of parallel lines of light, one for each scan line in the vidicon raster. This requires that a transmission diffraction grating be accurately imaged to the vidicon target. As the vidicon electron beam scans the raster, the output video signal is a function of the vertical scan error. The alignment of the scan to the illuminated line yields the maximum video output. A correction value for each sub-raster areas is obtained by perturbing the vertical scan in this region, until the video output is peaked. The computer methodically works its way over the raster area until the moire fringes resulting from vertical scan errors are corrected to yield one white fringe over the entire raster. While this method is quite effective, it requires a large array of expensive peripheral equipment and it requires that a high resolution grating be imaged to the vidicon target during correction.

SUMMARY OF THE INVENTION

The present invention utilizes a compound spatial reference filter which is imaged to the vidicon target during the correction mode to correct both the vertical and horizontal scans. The compound spatial reference provides a vertical spatial reference which comprises an array of slits having an opaque transmission grating and a horizontal spatial reference which comprises a yellow filter. The vertical corrections and horizontal corrections are made independently during operation of the vidicon camera by injecting a perturbation into the scan of interest and maximizing the video output. A microprocessor unit controls the calibration procedure and provides digital correction words for both the vertical and horizontal scans.

It is one object of the present invention, therefore, to provide an improved scan-corrected vidicon camera.

It is another object of the invention to provide an improved scan-corrected vidicon camera to correct both the vertical and horizontal scan errors.

It is another object of the invention to provide an improved scan-corrected vidicon camera to digitally process the camera video output to provide a digital correction.

It is yet another object of the invention to provide an improved scan-corrected vidicon camera to provide two spatial reference filters which are an integral part of the vidicon target.

These and other advantages, objects and features of the invention will become more apparent after considering the following description taken in conjunction with the illustrative embodiment in the accompanying drawings.

BRIEF DESCRIPTION OF THE DRAWINGS

FIG. 1 is a perspective view of the vidicon spatial reference filter which is utilized in the scan-corrected vidicon camera;

FIG. 3 is a block diagram of the scan-corrected vidicon camera system;

DESCRIPTION OF THE PREFERRED EMBODIMENT

Turning now to FIG. 1 there is shown a vidicon spatial reference filter unit 20 comprising a plurality of crossed horizontal and vertical stripes. The horizontal stripes 22 comprise the vertical scan spatial reference and sampling filter. The vertical stripes 24 comprise the horizontal spatial reference and is transparent in the operating mode light. The horizontal and vertical stripes 22, 24 are shown crossed at 90° with respect to each other.

In order to obtain the best possible interlocus isolation, it is necessary to use a mask called a sampling filter. The sampling filter is an array of slits which attenuates the adjacent line response more heavily than the main lobe response, as the slit width is narrowed. The spatial references, including the sampling filter will be imaged onto the vidicon target during the operational mode. In order to provide the best signal-to-noise ratio (SNR) scan error moire, it is necessary to illuminate the vidicon target in a series of well-defined (narrow) parallel lines of light. Thus, it is necessary to make the spatial reference an integral part of the vidicon target to obtain the highest signal to noise ratio moire. This gives the greatest change in video output with vertical scan error as well as horizontal scan error. Thus, the spatial reference filter 20 will be placed on the vidicon faceplate and the target formed over it.

In order to correct the vidicon vertical scan, the vidicon must be uniformly illuminated with white light. The slits will only illuminate the target in a narrow line and the video signal will now be sensitive to the electron beam position relative to the slit. When the electron beam is centered over the slit, the video output will be at a maximum. When the electron beam is closer to the slit's edge, the video output will be at a minimum. The correction technique is to perturb the vertical sweep in each raster sub-area to peak the video output.

If the vidicon were used only to correct the horizontal and vertical scan errors, the filter shown in FIG. 1 could be two crossed opaque gratings, however, it is necessary to have a readout capability along each entire vidicon scan. Therefore, the vertical spatial reference filter is constructed of a suitable material to provide an opaque transmission grating. Furthermore, a narrow slit width will be utilized to yield improved interlocus isolation.

Figure 2:
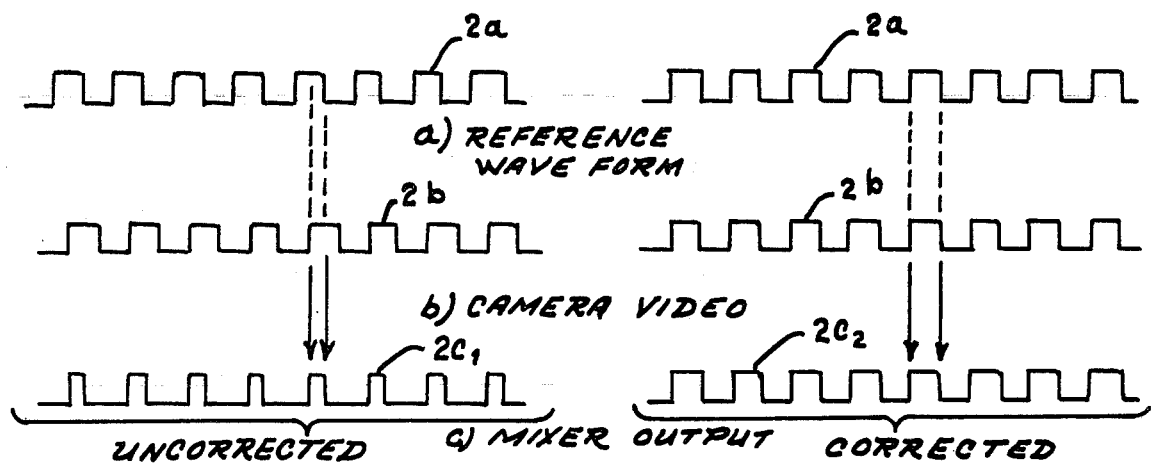
FIG. 2 is a graphical representation of the corrected and uncorrected signals which occur during the horizontal scan error correction.

The horizontal spatial reference filter is formed with a color filter such as yellow. This dielectric filter material has high optical transmission in the green and red portions of the visible spectrum and will produce minimum effect on the normal spectral readout. During horizontal scan correction mode, the filter is uniformly illuminated with blue light. The yellow filter is essentially a minus blue filter and produces a square-wave illumination down each vidicon scan line. There is shown in FIG. 2 the horizontal scan error-sense waveforms in both the corrected and uncorrected modes. The camera video $2b$ and the reference waveform signal $2a$ are gated together to provide an uncorrected output $2c$ and a corrected output $2c_2$. Camera video in each raster sub-area is compared with the reference waveform. In each raster sub-area the mixer output is integrated and the microprocessor perturbs the horizontal sweep waveform to peak the video output. In this operation the horizontal scan linearly is varied until the square-wave video output coincides with the reference waveform, as such this is a cross-correlation operation.

Turning now to FIG. 3, there is shown a scan-corrected vidicon camera system. The microprocessor unit 30 is the signal processing and correlating unit which uses a teletype unit 32 as the computer input/output device. A video error sensing unit 34 between the vidicon camera 36 and the microprocessor unit 30 to interface the camera output to the microprocessor unit 30 which generates a scan correction based on maximizing the video output. These digital corrections are generated in non-real time (off-line) in the microprocessor unit 30 and stored in a digital fast memory unit 38. During normal camera operation, the digital correction signals are applied from memory unit 38 to the camera unit 36 in real time.

The video output is coming from the target as illuminated through the filter. A time gate is utilized to select signals from a portion of the raster. The raster is divided into 32 by 32 areas or 1024 little sub areas. The time gate 31 permits the selection of any one of those thousand sub areas and thereby the reading of the intensity of the signal in that area. The time gate 31 is controlled by the microprocessor 30 and it controls a mode switch in the video sense I/O 34 to correct either the vertical or horizontal scan.

The microprocessor controls the correction operation by doing the vertical correction and then the horizontal correction or vice versa. The microprocessor controls the position of the mode switch according to the correction mode, either vertical or horizontal. For example, the microprocessor is set to make the vertical correction and is going to start in one corner of the raster, such as the upper left corner. The microprocessor 30 through time gate 31 throws the mode switch in the video sense unit 34 to vertical portion and looks at the first of the 1024 sample blocks and sees the video value that is in that block. The microprocessor makes a small vertical correction in one direction and looks at the video again. It makes the same correction in the opposite direction and looks at the video a third time. Now the microprocessor 30 has three values which are different and it can interpolate between these three values to see which correction gives a maximum output. So it computes the value of the correction, stores it and then goes on to the next point. The microprocessor 30 can only get one sample per frame, but it has to do it for each horizontal line. It has to do it for 1024 sub areas and there are about eight horizontal lines in each sub area. The face of the tube is essentially divided into 1024 sub areas, not physically but according to the microprocessor.

The microprocessor is commanded by an operator to begin the process of testing. Once the process is initiated, the microprocessor decides on the sub area it is going to test and it injects an perturbation. A perturbation shows up in the video the video then goes to the sense I/O where it is either in the vertical correction or horizontal correction. In the horizontal correction, there is a reference waveform that is generated in the circuit that generates the horizontal sweep in the camera and thereby is synchronized with the horizontal sweep. In that particular mode, the horizontal signal is pulled out of the video at that particular area, and compared against this reference. The output signal is run through the integrator and converted to a digital word which is sent to the processor. The processor stores that word. The processor now injects another perburation down through the memory to the camera and the procedure repeats another digital word comes back. It repeats the process until it has three digital words. The microprocessor knows which way or direction the perburations were made, looks at these words to determine the maximum output. Now it can interpolate in a direction to determine what size perburation is necessary to achieve the maximum video output for that area. The value of the line for that particular area is placed into that memory such that when the camera is sweeping through that area, the corrected value is utilized by the camera. This procedure is repeated for each of the horizontal areas and each of the vertical sub areas.

Figure 4:
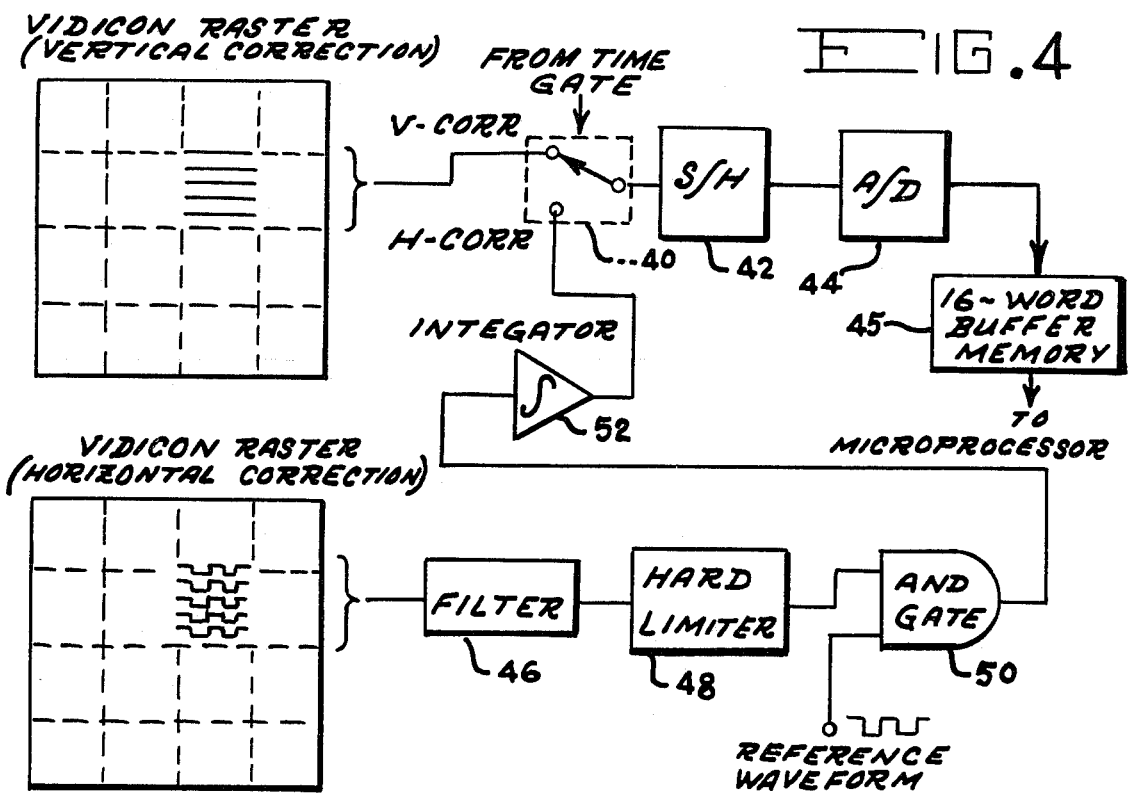
FIG. 4 is a block diagram of the video error sensing unit.

There is shown in FIG. 4, the video error sensing unit which receives the camera video during the correction process and interfaces the scan error data to the microprocessor. The video error sensing unit is controlled by the microprocessor which operates mode switch 40 to sense either the vertical or the horizontal scan.

In the vertical scan correction mode, the vidicon target is uniformly illuminated by a light source 39 (in FIG. 1) and the video in a selected sub-raster area is sensed near the end of the correction cell by a sample and hold circuit 42. The analog-to-digital converter unit 44 converts the analog video sample to an 8-bit digital word which is applied to a 16-word (digital) buffer memory 45. For each of 16 nominal scan lines in the cell, a digital word is placed into the buffer memory 45. The microprocessor can sample 1 sub area per frame. The buffer memory 45 stores the 16 data values of the subarea in real time, one value per line, i.e. 512 lines per frame/32=16 lines per subarea, and the microprocessor reads them and sums them. The microprocessor then averages these 16 samples to generate a number which describes the video output from this cell. The scan correction is effected by perturbing the vertical scan correction waveform until the video output is peaked. This digital correction is then stored and corrections are successively generated for all 1024 raster sub-areas which are shown by the dashed lines.

The horizontal-scan error sensing is accomplished in a different manner. The target is uniformly illuminated by light source 39 (in FIG. 1) with blue light. Due to the horizontal spatial reference, the video output is a nominal 5 MHz square-wave. This analog video signal is filtered in filter unit 46 and hard limited by limited unit 48 to recover zero crossings. The resultant square-wave is then gated in and gate 50 with a reference waveform which is also a square-wave to produce an output whose instantaneous value is a function of the alignment of these two square-waves.

An integrator unit 52 provides an output which is proportional to the average alignment (correlation) over the time duration of this horizontal scan line. As in the vertical correction system, the sample and hold unit 42 takes a sample of the integrator output near the end of the sub-area and the analog to digital converter unit 44 converts the sample to an 8-bit digital word. Thus, on each of the 16 nominal scan lines in this cell, an 8-bit word is transferred to the microprocessor's buffer memory, which represents the correlation between the video output and the reference waveform. The microprocessor averages these 16 words to generate the average correlation over the entire cell. The horizontal correction is effected by perturbing the horizontal sweep correction waveform to peak the average correlation in each raster sub-area.

Figure 5:
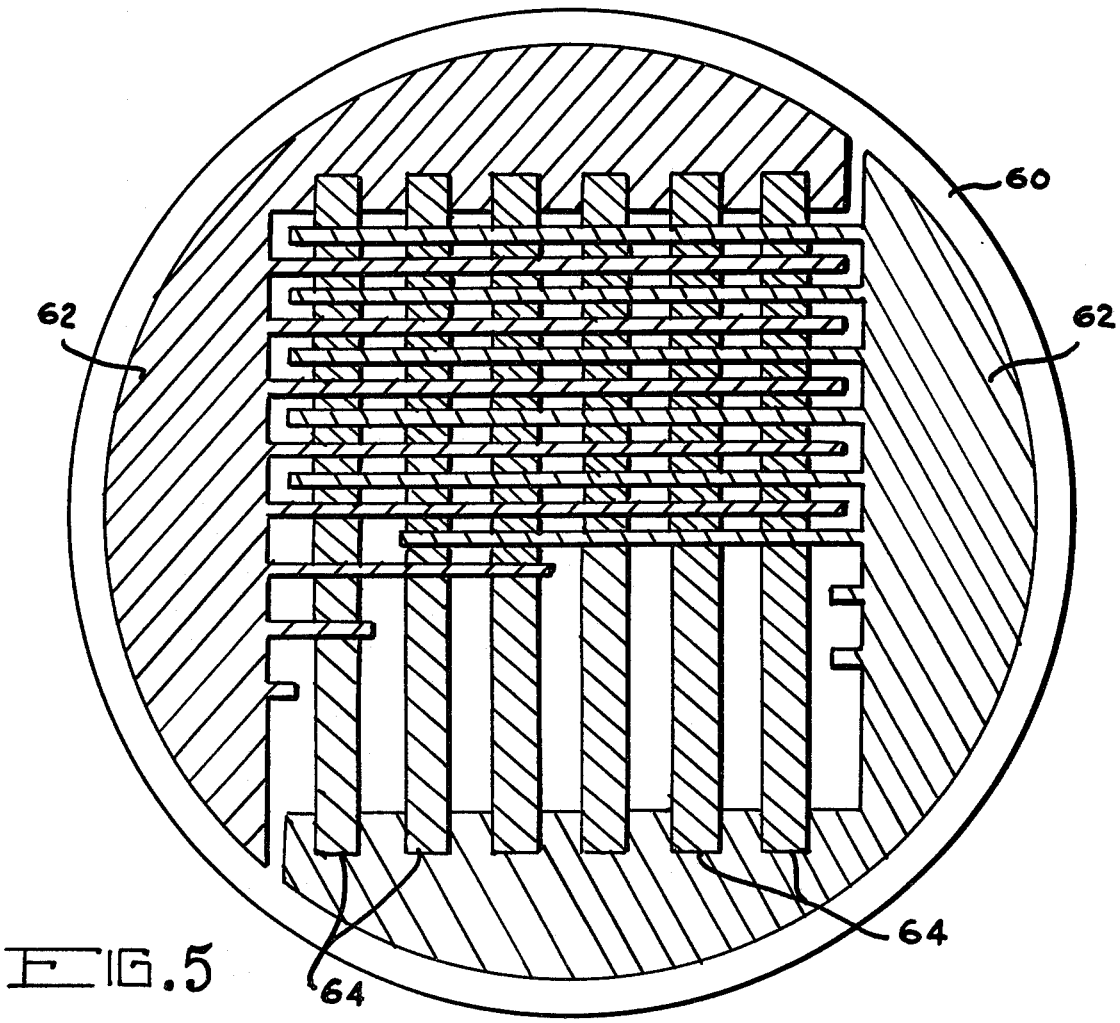
FIG. 5 is a front view of the vidicon spatial reference filter unit on the vidicon faceplate.

There is shown in greater detail in FIG. 5 the spatial reference filter as formed on the vidicon tube faceplate. The vidicon faceplate 60 which has a nominal 28 mm diameter, has the horizontal and vertical spatial references on one side and an AR coating on the opposite side. The vertical spatial reference 62 is an opaque chrome film with an array of parallel slits. The slit duty cycle is nominally set at 20 percent. This produces the highest contrast scan-error moire. Furthermore, narrow slits permit the filter to act as a sampling filter, as well as a spatial reference.

Figure 6:
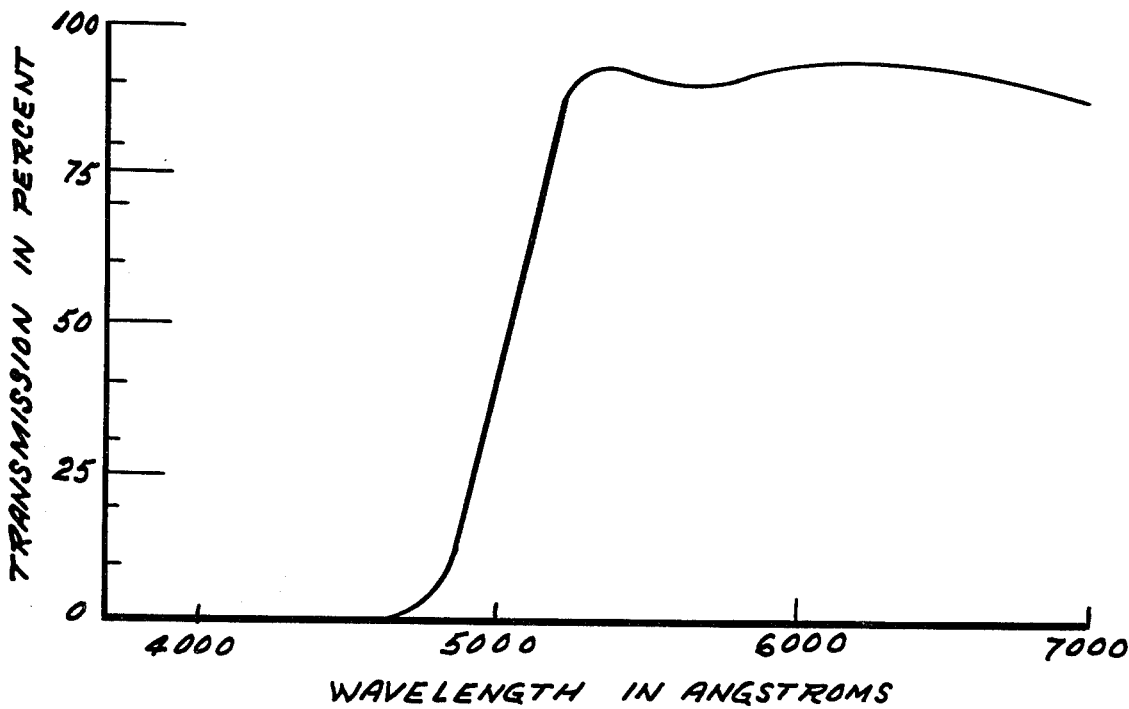
FIG. 6 is a graphical representation of the yellow filter spectral transmission response.

The horizontal spatial filter 64 is formed with the yellow stripe filter. The stripe filter has a nominal 2 mil period and with a 0.55 inch horizontal scan length we have about 256 cycles per scan, or about 8 cycles in each of the 32 subraster areas. This results in a nominal 5 MHz fundmental frequency component in the video output. In FIG. 6 there is shown the spectral transmission characteristic of the yellow stripe filter. It has about 90 percent transmission in its passband.

Although the invention has been described with reference to a particular embodiment, it will be understood to those skilled in the art that the invention is capable of a variety of alternative embodiments within the spirit and scope of the appended claims.

What is claimed is:

1. A scan corrected vidicon camera apparatus comprising in combination:
   a light source providing illumination
   a vidicon camera focused upon said illumination and being uniformly illuminated by said light source, said vidicon camera providing a video output,
   a pair of spatial reference filters directly mounted in said vidicon camera to provide a compound spatial reference, said vidicon camera having a faceplate and a target, said pair of spatial reference filters positioned between faceplate and said target,
   a video sense unit receiving said video output, said video sense unit sampling said video output and providing a digital word therefor, and
   a microprocessor unit receiving said digital word, said microprocessor including a control unit to initiate a calibration sequence within said microprocessor and a fast memory to store data therein, said microprocessor unit injecting a perturbation into said vidicon camera, said microprocessor unit utilizing said digital word to maximize said video output.

2. A scan corrected vidicon camera apparatus as described in claim 1 wherein said pair of spatial reference filters respectively comprises a vertical spatial reference and a horizontal spatial reference.

3. A scan corrected vidicon camera apparatus as described in claim 2 wherein said vertical spatial reference comprises a plurality of horizontal parallel lines.

4. A scan corrected vidicon camera apparatus as described in claim 2 wherein said horizontal spatial reference comprises a plurality of vertical parallel lines.

5. A scan corrected vidicon camera apparatus as described in claim 2 further including a trip gate responsive to commands from said microprocessor unit to control said video sense unit, said trip gate controlling said video sense unit to sense either vertical scan errors or horizontal scan errors.

6. A scan corrected vidicon camera apparatus as described in claim 2 wherein said vertical spatial reference filter comprises opaque chrome and said horizontal spatial reference filter comprises a yellow stripe filter.

7. A scan corrected vidicon camera apparatus as described in claim 2 wherein said microprocessor unit injects perturbations into the vertical scan to cause a vertical scan error, said microprocessor unit correlating said vertical scan errors to generate a vertical scan correction signal.

8. A scan corrected vidicon camera apparatus as described in claim 2 wherein said microprocessor unit injects perturbations into the horizontal scan to cause a horizontal scan error, said microprocessor unit correlating said horizontal scan errors to generate a horizontal scan correction signal.

9. A scan corrected vidicon camera apparatus as described in claim 5 wherein said illumination is white light for a vertical scan calibration and is blue light for a horizontal scan calibration.

* * * * *